United States Patent
Wyke

[19]

[11] Patent Number: 6,059,319
[45] Date of Patent: May 9, 2000

[54] APPARATUS FOR FORMING FIELD JOINTS ON PLASTIC COATED PIPE

[75] Inventor: Richard L. Wyke, Missouri City, Tex.

[73] Assignee: Floatec Corporation, Stafford, Tex.

[21] Appl. No.: 09/089,997

[22] Filed: Jun. 3, 1998

Related U.S. Application Data

[60] Provisional application No. 60/082,486, Apr. 21, 1998.

[51] Int. Cl.[7] ...................................................... H05B 3/58
[52] U.S. Cl. ........................ 285/21.2; 285/294.2; 219/535
[58] Field of Search .................................... 219/534, 535, 219/537, 541, 633; 439/100, 577; 285/21.2, 45, 55, 294.2, 294.4, 381.1

[56] References Cited

U.S. PATENT DOCUMENTS

| | | | |
|---|---|---|---|
| 2,331,098 | 10/1943 | White et al. | 219/535 X |
| 3,393,297 | 7/1968 | Hart | 219/535 X |
| 3,446,909 | 5/1969 | Kahn | 219/541 X |
| 3,657,517 | 4/1972 | Hoyt | 219/535 |
| 4,096,017 | 6/1978 | Wyke et al. | 156/275 |
| 4,207,918 | 6/1980 | Burns et al. | 285/45 X |
| 4,449,038 | 5/1984 | Reich et al. | 219/535 |
| 4,629,216 | 12/1986 | Pedersen | 285/21.2 |
| 5,364,130 | 11/1994 | Thalmann | 219/535 X |
| 5,573,848 | 11/1996 | Van Praet | 428/354 |
| 5,961,868 | 10/1999 | Schwarzkopf | 219/535 |
| 5,988,689 | 11/1999 | Lever | 285/21.2 X |

*Primary Examiner*—Lynne H. Browne
*Assistant Examiner*—Greg Binda
*Attorney, Agent, or Firm*—Conley, Rose & Tayon, P.C.

[57] ABSTRACT

A system and apparatus for sealing an uncoated portion of a length of plastic-coated pipe are disclosed. The system comprises a thermoplastic piece shaped to conform to the uncoated portion and overlap the pipe coating at an interface surrounding the uncoated portion, the piece including a heat-generating trace adjacent to its edges and the heat-generating trace including a plurality of trace leads extending therefrom. The system further comprises a clamp for applying pressure to the interface, the clamp including at least two compression bands and a cross member, each of the compression bands and the cross member including a plurality of power leads, each of the power leads corresponding to one of the trace leads. The power leads preferably automatically are placed into electrical contact with said trace leads when the clamp is applied over the thermoplastic piece.

12 Claims, 3 Drawing Sheets

APPARATUS FOR FORMING FIELD JOINTS ON PLASTIC COATED PIPE

CROSS-REFERENCE TO RELATED APPLICATIONS

The present application claims the benefit of 35 U.S.C. 119(e) provisional application Ser. No. 60/082,486 filed Apr. 21, 1998, and entitled Apparatus for Forming Field Joints on Plastic Coated Pipe.

STATEMENT REGARDING FEDERALLY SPONSORED RESEARCH OR DEVELOPMENT

Not applicable.

FIELD OF THE INVENTION

The present invention relates generally to an apparatus for applying and/or repairing field joints on plastic-coated pipelines and, more specifically, to a device and system for thermally fusing a layer of plastic to the plastic pipe coating so as to cover and cathodically and mechanically protect the area of the weld joint of a pipeline in the field. Still more particularly, the present invention comprises a circumferential compression clamp provided with circumferentially arrayed electrical leads and a corresponding field joint layer provided with circumferentially arrayed leads.

It is typical for pipelines to be provided with some type of protective coating for anticorrosion and mechanical purposes. Common types of coating include coal tar and asphalt enamel. A concrete coating or sheath can be applied to individual lengths of pipe in a coating yard, before the pipes are shipped to the location of the pipeline for placement in the ground. Alternatively, the coatings can be applied to the pipe "over the ditch" after it is welded and immediately before it is placed in the ground. Yard-applied coatings are preferred in many instances because a superior coating job can be performed under the controlled conditions of a coating plant. One problem with a yard-applied coating, however, is the need to coat the portion of the pipe on either side of the weld joint once two pipe sections have been joined together. This portion is typically less than about three feet long.

There are two known techniques for coating the weld joint area in the field. The first entails wrapping the weld joint area with a protective tape that overlaps the yard-applied coating at either end. The protective tape is not welded or fused to the yard-applied coating and therefore depends on adhesive bond it to the yard-applied coating. One of the primary disadvantages of this technique is that it is not possible to achieve a hermetic seal of great integrity. Because yard-applied coatings generally seal the pipe along its coated length, if tape is utilized in the area of the weld joint, the seal in that area will not be of the same quality as on the remainder of the pipe. One reason for this is that whenever tape is utilized to wrap the weld joint, the layers of tape will have their side edges exposed. The exposed adhesive will deteriorate and provide an area where moisture can eventually enter beneath the coating.

Another common technique for coating the area of the weld joint area of pipe in the field is to utilize a field-mold that is fitted around the pipe. The mold forms an annular space around the weld joint, into which space is poured a coating material that is compatible with the coating on the remainder of the pipe. While this process does result in the seal to the pipe surface in the area of the weld joint being of generally the same integrity as the coating on the remainder of the pipe, it lacks good adhesion to the plant-applied coating at the interface, as it may be difficult to achieve a good bond between the plant-applied coating and the field-applied coating. In addition, the process is very time consuming and therefore expensive.

In recent years new types of pipe coatings have been developed utilizing extruded thermoplastic materials. Coatings of this type provide a hermetic seal of high integrity along the length of the pipe but are not well suited to either of the techniques described above for coating the weld joint areas of a pipeline in the field.

It is therefore desired to provide a method and apparatus for sealing the weld joint area of pipe coated with a similar or compatible thermoplastic corrosion protective coating material that is capable of bonding to the yard-applied material. It is further desired to provide a system and device that allows the area of the weld joint to be coated in a maimer that provides a seal of the same quality and physical integrity as the coating on the remainder of the pipeline. It is further desired to provide a method and article for sealing the area of the weld joint of a pipeline that is easy to use and that is not highly dependent upon the skill of manual labor for uniformity of results. It is further desired to provide a method for patching damaged or otherwise uncoated portions of plastic coated pipe.

SUMMARY OF THE INVENTION

The present invention provides a system and device for quickly and easily sealing the weld joint area of a pipe coated with thermoplastic corrosion protective coating material. A joint sealed according to the present invention provides a seal of the same quality and physical integrity as the coating on the remainder of the pipeline. Use of the present system and device is easy to use and is not highly dependent upon the skill of manual labor for uniformity of results.

According to the present invention, the weld joint area of a plastic-coated pipe is fitted with a joint-sealing piece of compatible plastic that is large enough to span the distance between the opposite ends of the pipe coating and overlap the ends slightly. The present invention comprises a compression collar that can be slipped around the pipe so that it bears on the side edges of the joint-sealing piece where they overlap the pipe coating layer. The compression collar also bears on the overlapped ends of the joint-sealing piece. When the compression collar is latched, it applies a compressive force on each plastic interface that needs to be sealed.

The joint-sealing piece preferably includes a heat-generating trace that is configured to correspond to the regions of overlap at the sides and ends of the joint-sealing piece. When supplied with power, the heat-generating trace melts the plastic at the two mating surfaces in the immediate vicinity of the trace, causing it to fuse. The compression collar of the present invention preferably includes a plurality of conductive leads that are electrically connected to a power supply lead and adapted to contact the heat-generating trace at a plurality of points. The points at which the heat-generating trace contacts the joint-sealing piece are preferably spaced apart so as to cause a relatively even heating of the heat generating trace.

According to another embodiment, the joint-sealing piece includes a thermochromic component in the vicinity of the heat-generating trace. The thermochromic component preferably changes color at approximately the fusion temperature of the plastic that forms the pipe coating or the joint-sealing piece, so that completeness of fusion can be verified by visual inspection.

The present invention has applicability in both land- and marine-based pipeline construction operations. The procedure can also be used on concrete coated pipes, where a polymeric coating is inside the concrete coating. The present invention can also be used to apply a patch to a damaged portion of a polymeric pipe coating.

BRIEF DESCRIPTION OF THE DRAWINGS

For a more detailed description of the present invention, reference will now be made to the accompanying FIGS., wherein.

DETAILED DESCRIPTION OF A PREFERRED EMBODIMENT

Figure 1:
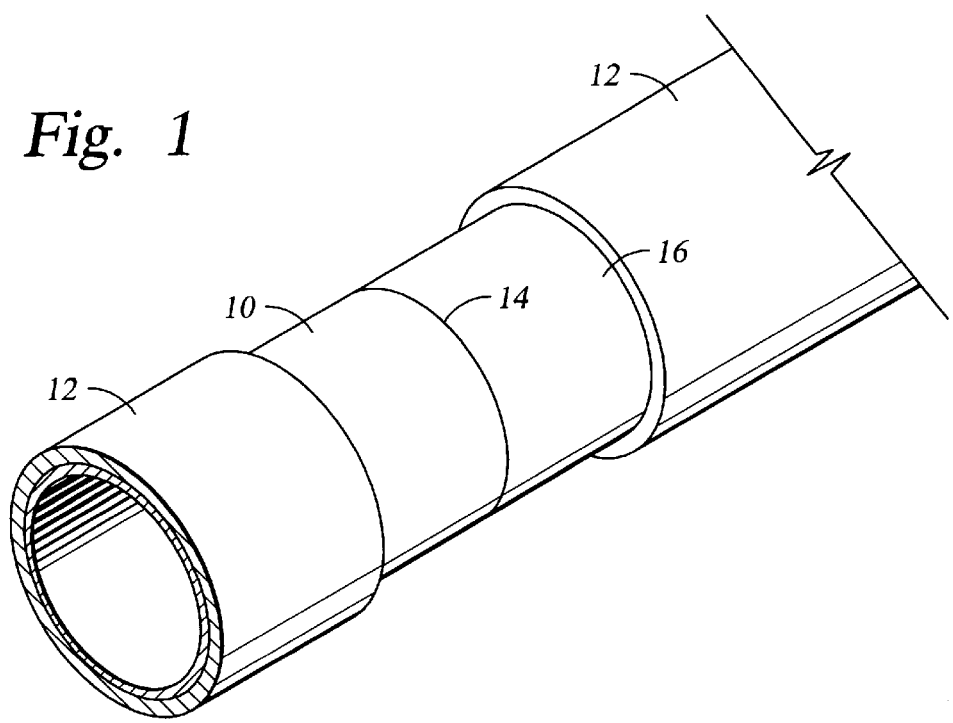
FIG. 1 is a perspective view illustrating a weld joint in a plastic-coated pipeline.
Figure 2:
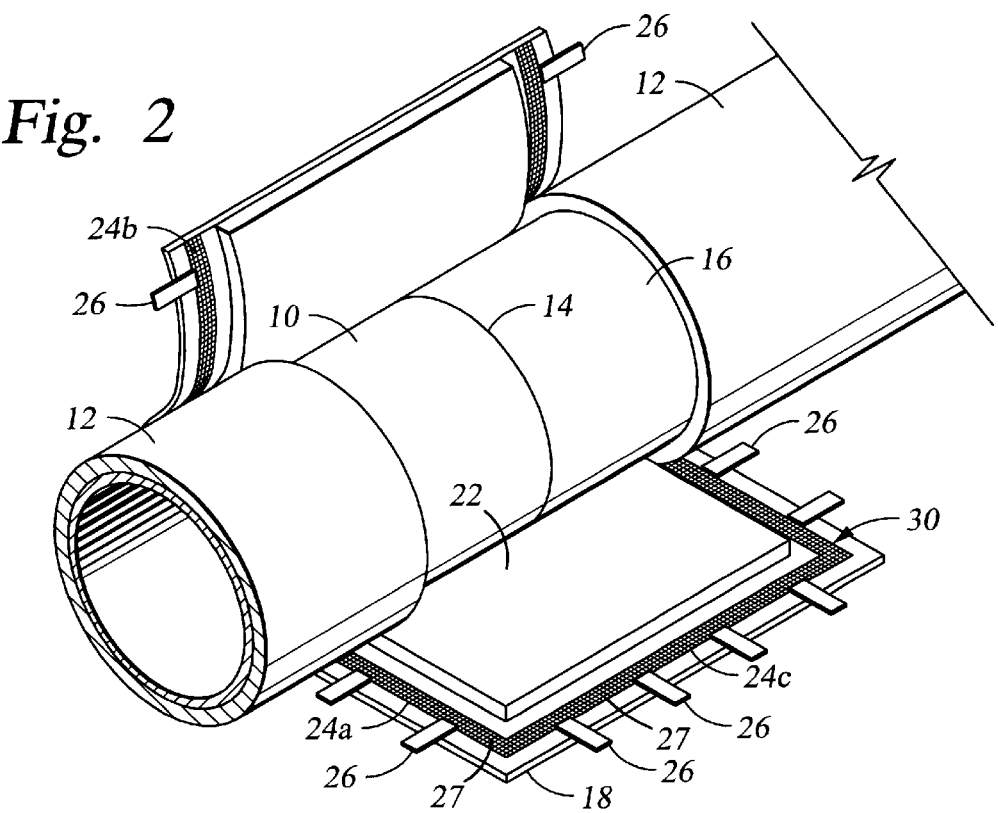
FIG. 2 is a perspective view illustrating the manner in which a joint-covering piece is wrapped around the weld joint.

Referring initially to FIGS. 1 and 2, two lengths of plastic coated pipe 10 are covered with a coating of thermoplastic material 12. The coating 12 terminates short of the end of each length of pipe. The ends of the pipes 10 are welded together to form a weld joint 14. An area 16 spanning from about 0.5 to about 1.5 feet on either side of weld joint 14 remains uncoated and therefore susceptible to corrosion. In a typical application, coating 12 is not less than about 25 mils in thickness and is preferably within the range of at least 40 to 75 mils thick.

Referring particularly to FIG. 2, a preformed joint-sealing piece 18 is wrapped around area 16 and overlap the ends of coating layers 12. Joint-sealing piece 18 is formed of a suitable thermoplastic material such as polyethylene and may include an under layer of 10 to 20 mils of butyl rubber or similar corrosion protection materials. Joint-sealing piece 18 preferably comprises a layer of thermoplastic material that is cut to a width that is somewhat greater than the distance between the ends of the coating material 12 on pipe 10. Joint-sealing piece 18 is preferably at least about 25 mils thick and preferably in the range of 40 to 75 mils thick. The thermoplastic material of which piece 18 is made is preferably the same as or compatible with the layer of thermoplastic material 12 and is capable of being bonded to material 12 by thermal fusion.

According to one embodiment, it is sometimes desirable to provide a corrosion preventive product as filler panel 22 on one face of joint-sealing piece 18. Panel 22 is preferably formed from butyl rubber, bitumastic, or rubberized bitumen and is of a width corresponding to the width of weld joint area 16. The thickness of panel 22 should be equal to the distance from the outside of the pipe to the outside of coating layer 12. Thus, if coating 12 comprises a thermoplastic resinous material with an adhesive undercoat, the thickness of panel 22 will equal the combined thickness of the adhesive plus layer 12. In most cases this will result in panel 22 having a thickness of no less than 35 mils and up to 100 mils. In other embodiments, filler panel 22 can be replaced with a wrapped layer of tape or fusion bonded epoxy, which serves the same purpose.

Still referring to FIG. 2, a conductive heat-generating trace 30 is affixed to the edges of joint-sealing piece 18. Heat-generating trace 30 is preferably in the form of a strip or strips of wire mesh 24a–c. Strips 24a and 24b extend along each side of piece 18, while strip 24c extends across one end of piece 18. According to a preferred embodiment, strips 24a–c are formed from a single length of mesh that is folded into 90° turns at the corners. Also according to a preferred embodiment, a plurality of conductive leads 26 are electrically connected to strips 24 and extend beyond the perimeter of piece 18. Preferably, a lead 26 is positioned at least at each end of strip 24c. Leads 26 are preferably formed of a low resistance material such as copper. Each portion of each strip 24a, 24b between adjacent leads 26 forms a resistance heating element 27.

When piece 18 is placed around weld area 16 of pipe 10 as shown, adhesive panel 22 fills area 16 and piece 18 overlies the thermoplastic coating 12 on the pipe. Side strips 24a and 24b are sandwiched between coating 12 and piece 18. At the same time, the third strip 24c is sandwiched between the two overlapping ends of piece 18. Once the joint-covering piece is positioned in this manner, electrical power can be applied though leads 26. For this reason, it is desirable to space leads 26 evenly around the circumference of the pipe, so that the current flow in each resistance heating section 27 is the same. This results in uniform heating of the thermoplastic material in the vicinity of each heating section. It is also desirable to select the resistance value for strip 24c such that the heat output from this strip will be equal to the heat output from lengths 24.

The conducting material used to form strips 24a–c is selected to have sufficient resistance when electrically energized to produce enough heat to melt the thermoplastic material(s) of which 12 and 18 are made. A preferred resistance wire comprises an alloy of sixty percent nickel, twenty-four percent iron, sixteen percent chromium and 0.1 percent carbon and sold under the trademark "NICHROME" by the Driver-Harris Co. The Nichrome wire is preferably formed into a relatively fine wire mesh.

There are particular advantages to using a heat-generating trace in the form of a mesh. The wire mesh heats evenly and tends to stay near the surface of the thermoplastic layer to which it is attached, even when stored for a long period of time. The mesh also offers a certain amount of structural strength to the fused interface and prevents the energized wire from cutting through material 20 or coating 12 during fusion. Additional details regarding fusing of the joint-covering piece 18 to the pipe coating are disclosed in U.S. Pat. No. 4,096,017, which is incorporated herein in its entirety.

According to one preferred embodiment, the material forming heat generating trace 30 is stitched onto piece 18. Stitching provides a flexible, durable and uniform connection of the metal mesh strips to the polymeric piece. A suitable thread for this stitching comprises non-conducting thread, such as nylon monofilament. In another embodiment, the strips of material are replaced with at least one row of two-thread stitching 28 in which one thread 28a is non-conducting and the other thread 28b is conducting. As will be understood by those skilled in the art, the conducting thread 28b lies along the inner face 19 of piece 18 and contacts coating 12. In this embodiment, stitching 28 itself forms the heat-generating trace 30 so that no additional conductor is needed.

Figure 3:
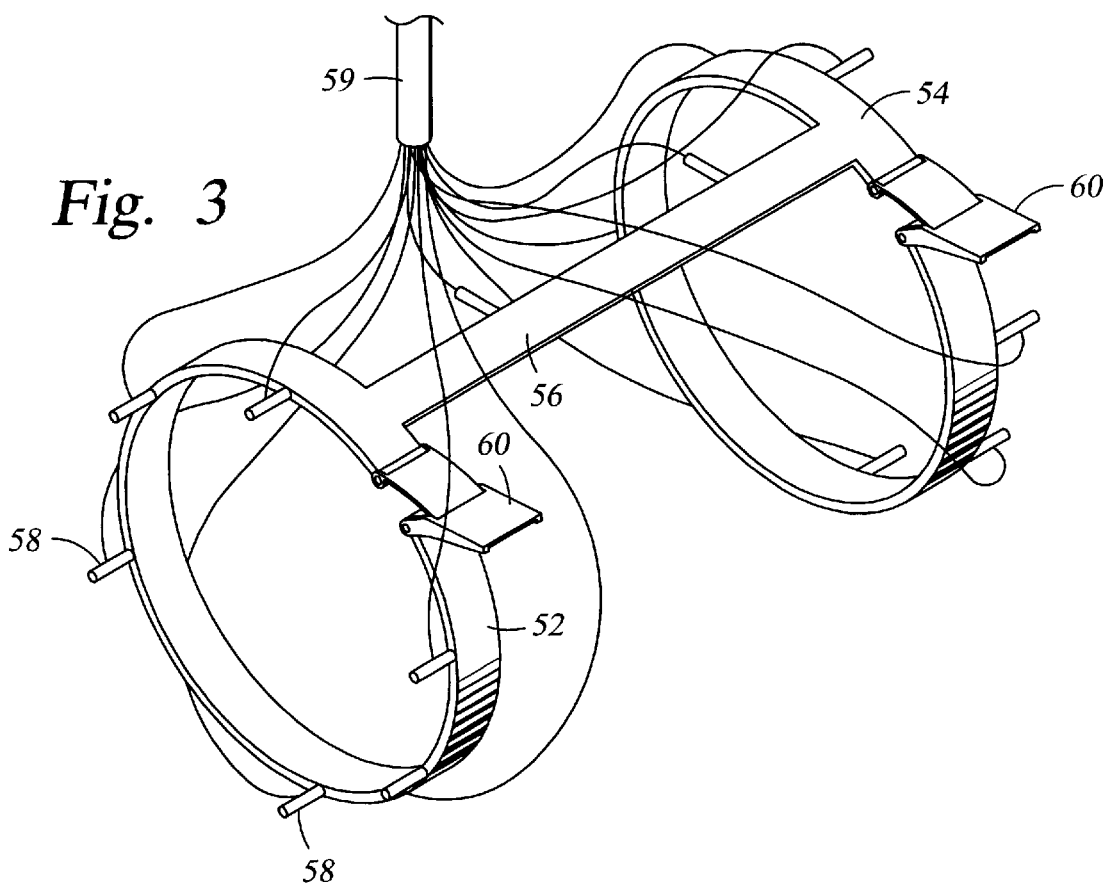
FIG. 3 is a perspective view of a compression collar in accordance with the present invention.
Figure 4:
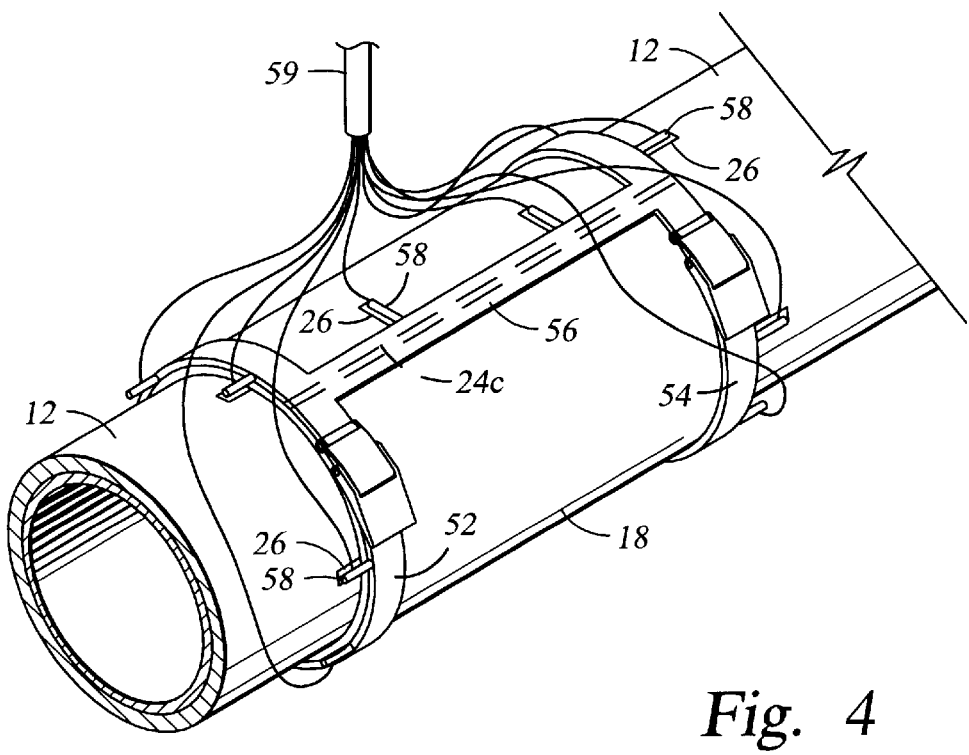
FIG. 4 is a perspective view of the compression collar of FIG. 3 positioned over the joint-covering piece of FIG. 2.
Figure 5:
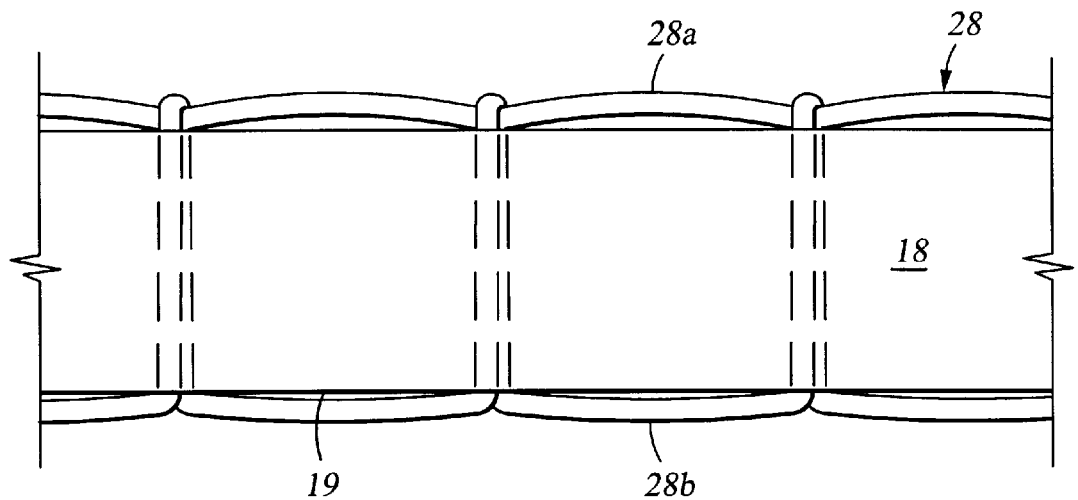
FIG. 5 is an enlarged view of an alternative embodiment of a heat generating trace on the present joint covering piece.

Referring now to FIGS. 3 and 4, a compression collar 50 constructed according to the present invention comprises a pair of compression bands 52, 54 connected by a cross member 56. A plurality of power leads 58 are spaced about the compression bands 52, 54 and extend beyond the side edges thereof. Additional leads 58 extend from cross member 56. Leads 58 are collected in parallel to a power supply (not shown) via a power cable. The number and positioning of power leads 58 preferably corresponds to the number and positioning of leads 26 on strips 24, so that when collar 50 is positioned around the weld joint, power leads 58 align with and can be easily connected to leads 26, such as by means of alligator clips or the like. Leads 58 are preferably releasably clipped to leads 26 by means of alligator clips or other suitable attachment devices such as are known in the art.

While the wires connecting each lead to the power source are shown loosely overlying the device in FIG. 3 for ease of understanding, it is preferred that they be formed into a bundle 59 and affixed to the device, as shown in FIG. 4, so as to facilitate handling of the device and prevent objects from becoming entangled in the wires. It is preferred that there be an even number of power leads, and that they alternate polarity around the circumference of the pipe. In this preferred configuration, resistance heating sections 27 are also in parallel and current flows in opposite directions in adjacent resistance heating sections 27 when power is supplied to the leads. Also, the current flowing in each resistance heating section 27 will be one-half the current in leads 58, 26. It is further preferred that there be at least four, and more preferably at least six leads at each circumferential interface and at least four leads along the longitudinal interface under crosspiece 56, so as to ensure even heating and thus better sealing results. As will be understood by those skilled in the art, the resistance of the various foregoing components and the voltage supplied across them can be varied so as to achieve the desired heating effect. Similarly, the length of time for which voltage is supplied to a given joint can be varied to produce a desired effect.

Compression bands 52, 54 each preferably fasten around the pipe with a quick-release type latch 60 that allows bands 52, 54 to be tensioned prior to latching. Tensioning of bands 52, 54 applies a radial compression force to the outside of the pipe. The inside surfaces of bands 52, 54 and cross member 56 are preferably provided with a resilient lining (not shown) that helps to evenly distribute the compression force over the interface area and reduces damage to the plastic piece 18. In a preferred embodiment, an additional circumferential strap (not shown) encircles the device between straps 52, 54 and applies a compressive force to crosspiece 56 when tightened.

In another preferred embodiment, panel 22 is omitted from the inner surface of piece 18 and the annulus between the inner surface of piece 18 and the pipe is filled instead in an alternative manner, or is left unfilled. Specifically, in one embodiment, the weld joint area is wrapped with a resilient material, such as mastic tape, prior to positioning of piece 18. In another embodiment, the annulus is left empty until after the ends and sides of piece 18 are fused and the annular space is thereby sealed. Once the seal is formed, a liquid sealant, such as a fast-setting polymer, can be injected into the annular space through a small hole. Alternatively, a fast-setting foaming polymeric composition can be used to fill the annulus, or, for some thermal insulation applications, foam pieces that are preformed to fill the annulus can be placed around the weld joint area before the cover is applied. If foam is used in the annulus, it may be desirable to adjust the density of the foam depending on the pressure environment in which the pipeline will be placed.

In still another preferred embodiment, the material of piece 18 is made temperature sensitive, so that the elevation of the temperature of piece 18 to a predetermined temperature is indicated by a visible change in color. The predetermined temperature is preferably approximately the fusion temperature for the polymeric materials.

Figure 6:
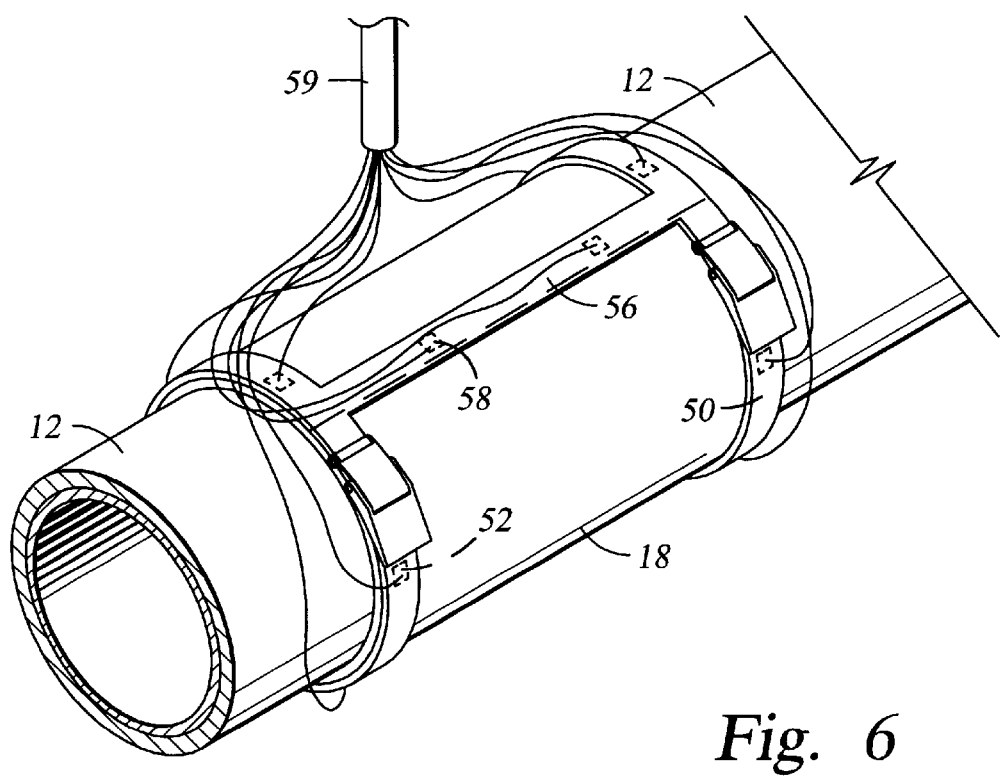
FIG. 6 is a perspective view of a an alternative embodiment of a compression collar in accordance with the present invention.

Referring now to FIG. 6, in an alternative embodiment, the leads on piece 18 and compression collar 50 are configured such that the electrical connection therebetween is made automatically when collar 50 is clamped around the field joint. This can be accomplished by bending each lead 26 back so that it lies against the outer surface of piece 18. When collar 50 is clamped around the field joint, electrical contacts 58 on its inner surface (shown in phantom) contact the leads without requiring any additional connecting steps. In another embodiment, leads 58 can be mechanically biased so that when collar 50 is clamped around the field joint leads 58 bear on leads 26 and maintain electrical contact therewith. These configurations for achieving automatic electrical contact are merely illustrative and the various methods for achieving this result can each be used alone or in combination with other methods. These devices eliminate the need for an additional connection step and thereby save time and money.

It is preferred that the inner surface of collar 50 comprise a material to which the polymer of the pipe coating and the field joint will not adhere when melted. This will allow collar 50 to be easily removed from the field joint, even when the portion of the polymer that lies against the inner surface of the collar melts during fusion. Preferred materials having this characteristic include silicone and fluorine-containing synthetic resins.

For most typical thermoplastic coating materials, and for a typical resistance wire, a current of between 30 and 200 amps will be required to achieve the necessary bonding in a reasonable amount of time. Generally, a current of between 30 and 200 amps that is applied for between thirty seconds and five minutes is adequate to achieve integral fusion of the two thermoplastic layers.

The present device and method can be used on concrete coated pipes, where a polymeric coating is inside the concrete coating, or on foam coated pipes, and can be used in conjunction with injected or preformed foamed coatings. The present invention can also be used to apply a patch to a damaged portion of a polymeric pipe coating.

While preferred embodiments of this invention have been shown and described, modifications thereof can be made by one skilled in the art without the departing from the spirit or teaching of this invention. The embodiments described herein are exemplary only and are not limiting. Many variations and modifications of the system and apparatus are possible and are within the scope of the invention. Accordingly, the scope of the protection is not limited to the embodiments described herein, but is only limited by the claims which follow, the scope of which shall include all equivalents of the subject matter of the claims.

What is claimed is:

1. An apparatus for sealing a cover onto an uncoated portion of a plastic-coated pipe, the cover contacting the plastic coating at an interface and including a heat-generating trace in the vicinity of the interface and said heat-generating trace including a plurality of trace leads extending therefrom, comprising:

a releasable clamp for applying a compression force to the interface, said clamp including a pair of compression bands connected by a cross member, each of said compression bands including a releasable tensioning latch;

a plurality of electrical power leads supported on said clamp and positioned so as to correspond to the trace leads such that when said power leads contact the trace leads and power is supplied to said power leads, sufficient heat is generated in the trace to fuse the cover to the coating at the interface.

2. The apparatus according to claim 1 wherein said clamp includes a resilient lining on its inner surface.

3. The apparatus according to claim 1 wherein each said compression band supports at least four power leads.

4. The apparatus according to claim 1 wherein each said compression band supports at least six power leads.

5. The apparatus according to claim 1 wherein each compression band supports an even number of power leads and adjacent power leads on each compression band are of opposite polarity.

6. The apparatus according to claim 1, further including at least a pair of leads for supplying power to a portion of the interface that is under said cross member.

7. The apparatus according to claim 1 wherein electrical connection between the trace leads and said power leads is effected by clamping said clamp so as to apply pressure at the interface.

8. A system for sealing an uncoated portion of a length of plastic-coated pipe, comprising:

a thermoplastic piece shaped to conform to the uncoated portion and overlap the pipe coating at an interface surrounding the uncoated portion, said piece including a heat-generating trace affixed to said piece adjacent its edges, said heat-generating trace including a plurality of trace leads extending therefrom; and a clamp for applying a radial compression force to said interface, wherein said clamp includes at least two compression bands and a cross member, each of said compression bands including a plurality of power leads, each of said power leads corresponding to one of said trace leads.

9. A system for sealing an uncoated portion of a length of plastic-coated pipe comprising:

a thermoplastic piece shaped to conform to the uncoated portion and overlap the pipe coating at an interface surrounding the uncoated portion, said piece including a heat-generating trace affixed to said piece adjacent its edges, said heat-generating trace including a plurality of trace leads extending therefrom; and a clamp for applying a radial compression force to said interface, wherein said clamp comprises at least one compression band, said at least one compression band supporting an even number of lower leads, adjacent power leads on said compression band being of opposite polarity.

10. A system for sealing an uncoated portion of a length of plastic-coated pipe, comprising:

a thermoplastic piece shaped to conform to the uncoated portion and overlap the pipe coating at an interface surrounding the uncoated portion, said piece including a heat-generating trace affixed to said piece adjacent its edges, said heat-generating trace including a plurality of trace leads extending therefrom; and a clamp for applying a radial compression force to said interface, said clamp comprising at least two compression bands, wherein each of said compression bands supports at least four power leads.

11. A system for sealing an uncoated portion of a length of plastic-coated pipe comprising:

a thermoplastic piece shaped to conform to the uncoated portion and overlap the pipe coating at an interface surrounding the uncoated portion, said piece including a heat-generating trace affixed to said piece adjacent its edges, said heat-generating trace including a plurality of trace leads extending therefrom; and a clamp for applying a radial compression force to said interface, wherein said clamp has an outer surface and an inner surface and said inner surface includes electrical power contacts that electrically contact said trace leads automatically when said clamp applies pressure to said interface.

12. A system for scaling an uncoated portion of a length of plastic-coated pipe, comprising:

a thermoplastic piece shaped to conform to the uncoated portion and overlap the pipe coating at an interface surrounding the uncoated portion, said piece including a heat-generating trace affixed to said piece adjacent its edges, said heat-generating trace including a plurality of trace leads extending therefrom; and a clamp for applying a radial compression force to said interface, wherein said clamp is fastened with a releasable latch.

* * * * *